(12) United States Patent
Lundgren et al.

(10) Patent No.: US 9,472,320 B2
(45) Date of Patent: Oct. 18, 2016

(54) METAL SHEATHED CABLE ASSEMBLY WITH NON-LINEAR BONDING/GROUNDING CONDUCTOR

(75) Inventors: Stephen A. Lundgren, East Providence, RI (US); Skip N. Afdasta, Coventry, RI (US); Robert A. Pereira, Rochester, MA (US)

(73) Assignee: WPFY, Inc., Wilmington, DE (US)

( * ) Notice: Subject to any disclaimer, the term of this patent is extended or adjusted under 35 U.S.C. 154(b) by 400 days.

(21) Appl. No.: 13/422,319

(22) Filed: Mar. 16, 2012

(65) Prior Publication Data

US 2013/0240237 A1    Sep. 19, 2013

(51) Int. Cl.
| | |
|---|---|
| *H01B 7/18* | (2006.01) |
| *H01B 7/20* | (2006.01) |
| *H01B 11/04* | (2006.01) |

(Continued)

(52) U.S. Cl.
CPC ............... *H01B 7/20* (2013.01); *H01B 11/02* (2013.01); *H01B 11/04* (2013.01); *H02G 3/0468* (2013.01); *H01B 7/18* (2013.01); *H01B 7/202* (2013.01); *H01B 7/226* (2013.01); *H01B 7/28* (2013.01);

(Continued)

(58) Field of Classification Search
CPC ............ H01B 7/14; H01B 7/18; H01B 7/20; H01B 7/28; H01B 7/046; H01B 7/202; H01B 7/226; H01B 7/0869; H01B 11/04; H01B 11/06; H01B 11/1808; H01B 11/1839; H01B 9/02; H01B 9/03; H01B 9/04; H01B 9/23; H01B 9/27; H01B 9/28
USPC ..... 174/120 R, 103, 108, 109, 112 R, 113 R, 174/174, 15.4, 15.5, 125.1; 505/230, 231
See application file for complete search history.

(56) References Cited

U.S. PATENT DOCUMENTS

| | | | |
|---|---|---|---|
| 2,866,843 A | 12/1958 | Arman | |
| 2,954,724 A * | 10/1960 | Walton | ......................... 89/1.706 |

(Continued)

FOREIGN PATENT DOCUMENTS

| | | | |
|---|---|---|---|
| CN | 200990698 | 12/2007 | |
| JP | 2003-242840 A * | 8/2003 | ............. H01B 11/08 |

OTHER PUBLICATIONS

UL Standard for Safety of Metal-Clad Cables, UL 1569, "Metal-Clad Cables", Third Edition, dated Aug. 31, 1999.

(Continued)

*Primary Examiner* — Ishwarbhai B Patel
*Assistant Examiner* — Paresh Paghadal

(57) ABSTRACT

A Metal-Clad cable includes at least two conductor assemblies and a non-linear bonding/grounding conductor within a metal sheath. Each conductor assembly has an electrical conductor, an insulation layer extending around and along the length of each of the electrical conductors, a jacket layer disposed around the insulating layer and a polymeric protective layer disposed around the jacket layer along the length of each of the electrical conductors. The bonding/grounding conductor includes a plurality of undulations disposed along a length thereof, and is disposed within the metal sheath so that it is in contact with an interior surface of the metal sheath. The bonding/grounding conductor is in cabled relation with the conductor assemblies. The undulations of the bonding/grounding conductor provide a degree of resiliency to the connection between the conductors and the metal sheath to facilitate easy removal of the metal sheath when making terminal connections.

22 Claims, 12 Drawing Sheets

(51) Int. Cl.
- *H01B 11/02* (2006.01)
- *H02G 3/04* (2006.01)
- *H01B 7/28* (2006.01)
- *H01B 7/22* (2006.01)
- *H01B 9/02* (2006.01)
- *H01B 9/04* (2006.01)

(52) U.S. Cl.
CPC ............... *H01B 9/02* (2013.01); *H01B 9/028* (2013.01); *H01B 9/04* (2013.01); *Y10T 29/49194* (2015.01)

(56) References Cited

U.S. PATENT DOCUMENTS

| | | | |
|---|---|---|---|
| 3,032,604 A | 5/1962 | Timmons | |
| 3,829,603 A | 8/1974 | Hansen et al. | |
| 3,896,261 A * | 7/1975 | Cole | 174/115 |
| 4,194,536 A * | 3/1980 | Stine et al. | 138/149 |
| 4,374,299 A | 2/1983 | Kincaid | |
| 4,378,462 A * | 3/1983 | Arnold, Jr. et al. | 174/70 A |
| 4,584,432 A * | 4/1986 | Thevenon | 174/128.1 |
| 4,943,699 A | 7/1990 | Thommes | |
| 4,956,523 A | 9/1990 | Pawluk | |
| 5,043,538 A | 8/1991 | Hughey, Jr. et al. | |
| 5,220,130 A | 6/1993 | Walters | |
| 5,246,783 A | 9/1993 | Spenadel et al. | |
| 5,281,762 A | 1/1994 | Long et al. | |
| 5,329,064 A | 7/1994 | Tash et al. | |
| 5,329,065 A * | 7/1994 | Marney et al. | 174/128.1 |
| 5,414,217 A | 5/1995 | Neuroth et al. | |
| 5,416,268 A | 5/1995 | Ellis | |
| 5,426,264 A | 6/1995 | Livingston et al. | |
| 5,431,759 A | 7/1995 | Neuroth | |
| 5,451,718 A | 9/1995 | Dixon | |
| 5,486,649 A | 1/1996 | Gareis | |
| 5,574,250 A | 11/1996 | Hardie | |
| 5,920,032 A | 7/1999 | Aeschbacher et al. | |
| 6,010,788 A | 1/2000 | Kebabjian et al. | |
| 6,254,924 B1 * | 7/2001 | Brorein et al. | 427/117 |
| 6,255,592 B1 | 7/2001 | Pennington et al. | |
| 6,255,594 B1 * | 7/2001 | Hudson | 174/121 A |
| 6,281,443 B1 | 8/2001 | Idler | |
| 6,485,335 B1 | 11/2002 | Dewdney | |
| 6,486,395 B1 * | 11/2002 | Temblador | 174/36 |
| 6,743,387 B2 | 6/2004 | Belli et al. | |
| 6,815,617 B1 | 11/2004 | Gebs | |
| 6,906,264 B1 | 6/2005 | Grant, Jr. et al. | |
| 6,998,538 B1 | 2/2006 | Fetterolf, Sr. et al. | |
| 7,049,506 B2 * | 5/2006 | Head | 174/36 |
| 7,057,112 B1 * | 6/2006 | Chen | 174/110 R |
| 7,129,415 B1 | 10/2006 | Bates et al. | |
| 7,148,422 B2 | 12/2006 | Hopper | |
| 7,166,802 B2 | 1/2007 | Cusson et al. | |
| 7,332,676 B2 | 2/2008 | Sparrowhawk | |
| 2001/0040041 A1 | 11/2001 | Pennington et al. | |
| 2002/0079128 A1 * | 6/2002 | Karrmann | H01B 7/0233 174/113 AS |
| 2004/0065469 A1 | 4/2004 | Goldlust et al. | |
| 2004/0074654 A1 * | 4/2004 | Springer | H01B 11/1847 174/28 |
| 2005/0045367 A1 * | 3/2005 | Somers | H01B 11/04 174/113 R |
| 2006/0102380 A1 | 5/2006 | Hu | |
| 2007/0056762 A1 | 3/2007 | Cusson et al. | |
| 2008/0050588 A1 | 2/2008 | Broman et al. | |
| 2008/0217044 A1 * | 9/2008 | Carlson et al. | 174/113 R |
| 2009/0183897 A1 * | 7/2009 | Plourde | H01B 11/1847 174/120 R |
| 2009/0250238 A1 * | 10/2009 | Picard et al. | 174/102 R |
| 2009/0250239 A1 * | 10/2009 | Picard et al. | 174/109 |
| 2012/0103646 A1 * | 5/2012 | Fox et al. | 174/34 |

OTHER PUBLICATIONS

UL Standard for Safety for Armored Cable, UL 4, "Armored Cable," Fourteenth Edition, Jan. 30, 1996.

\* cited by examiner

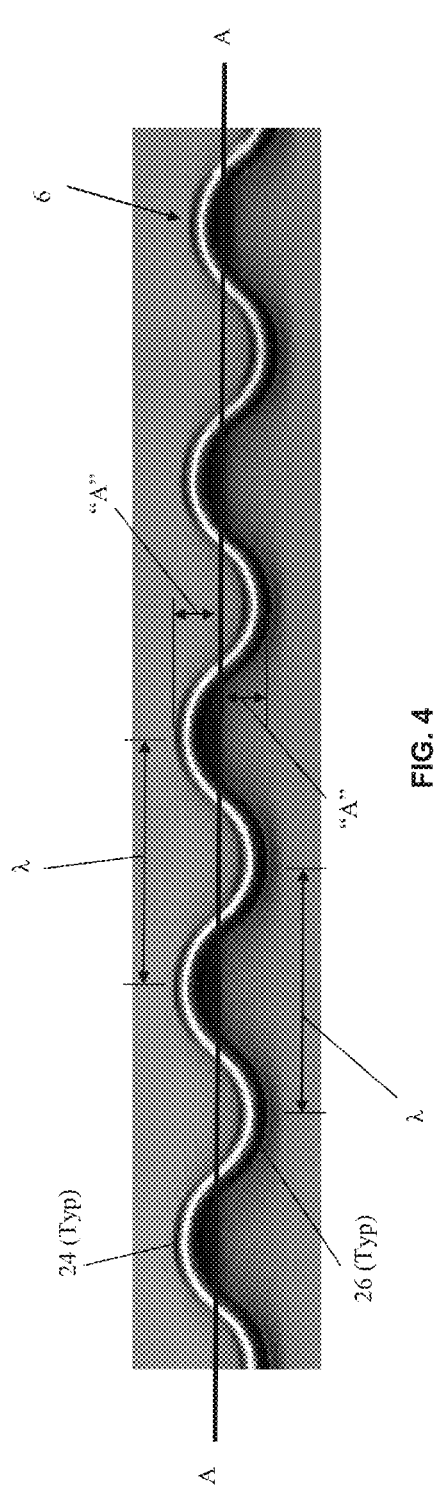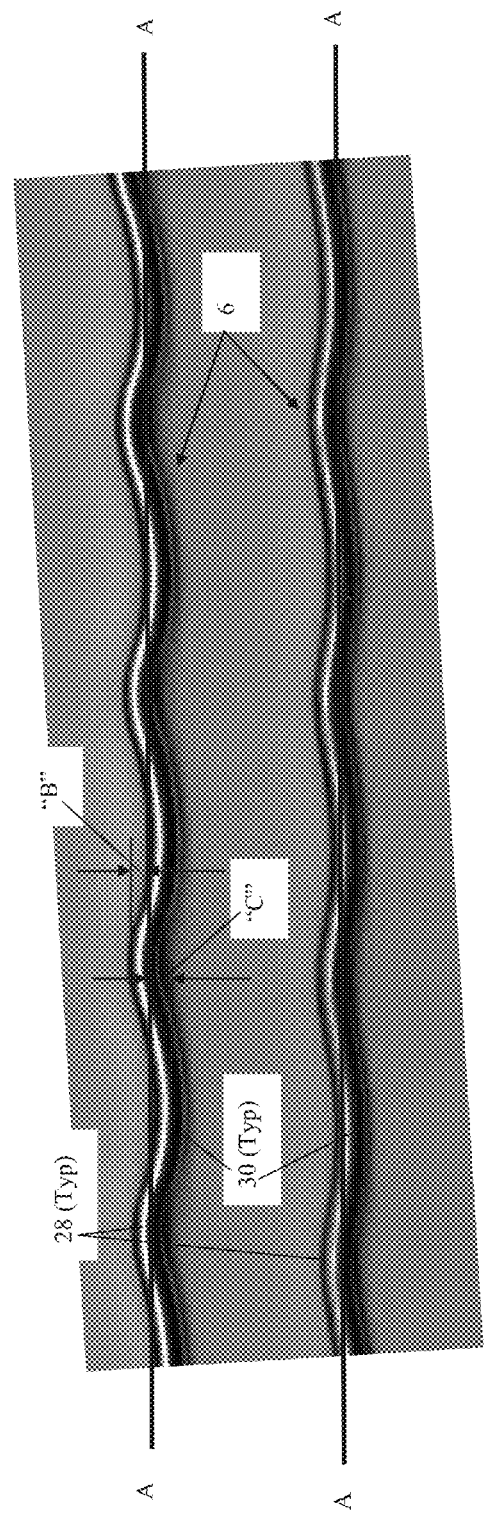
FIG. 4
FIG. 5

METAL SHEATHED CABLE ASSEMBLY WITH NON-LINEAR BONDING/GROUNDING CONDUCTOR

BACKGROUND OF THE INVENTION

1. Field of the Invention

The present disclosure relates generally to a Metal-Clad Cable Type MC. More particularly, the present disclosure relates to a Metal-Clad Cable Type MC assembly which includes electrical conductors and a non-linear bonding/grounding conductor that engages the metal cladding to provide a desired ground path, while facilitating removal of the cladding during installation.

2. Discussion of Related Art

Armored cable ("AC") and Metal-Clad ("MC") cable provide electrical wiring in various types of construction applications. The type, use and composition of these cables must satisfy certain standards as set forth, for example, in the National Electric Code (NEC®). These cables house electrical conductors within a metal armor. The metal armor may be flexible to enable the cable to bend while still protecting the conductors against external damage during and after installation. The armor which houses the electrical conductors may be made from steel or aluminum, copper-alloys, bronze-alloys and/or aluminum alloys. Typically, the metal armor sheath is formed from strip steel, for example, which is helically wrapped to form a series of interlocked "S" shaped sections along a longitudinal length of the cable. Alternatively, the sheaths may be made from smooth or corrugated metal.

MC cable is manufactured according to Underwriters Laboratories Inc. Standard ANSI/UL 1569 and includes a conductor assembly with a plurality of electrical conductors having a particular AWG (American Wire Gauge) size. Metal-Clad Cable with interlocked armor must contain a bare or insulated equipment grounding conductor (EGC) or may contain a bonding/grounding conductor. The electrical conductors and the ground conductor are cabled together in a left or right hand lay and encased collectively in an overall covering. The assembly is then fed into an armoring machine where metal tape is helically applied around the assembly to form a metal sheath. The metallic sheath of continuous or corrugated Type MC Cable may be used as an equipment grounding conductor if the ohmic resistance satisfies the requirements of UL 1569. As noted, a bonding/grounding conductor is often included. This bonding/grounding conductor, in combination with the metallic sheath, shall satisfy UL ohmic resistance requirements. In such cases, the metallic sheath and the bonding/grounding conductor comprise what is referred to as a metallic sheath assembly that is listed and identified as an equipment grounding conductor.

Type MC Cable includes either a covering over all of the electrically insulated conductors and the equipment grounding conductor after cabling, or a covering over just the electrical insulated conductors combined after cabling with the bonding/grounding conductor is positioned externally separate from this overall covering. This covering material is typically a tape of nonmetallic material composed of polypropylene or polyester. This covering material does not provide conductor to conductor mechanical protection nor does it provide protection within an enclosure such as a junction box or panel when the cable is installed therein.

In use, the metallic sheath must be removed from around the electrical conductors in order to make appropriate terminations at junction boxes, panel boards, and the like. Typically this involves cutting the metallic sheath and pulling the cut portion of the sheath along the conductors until the cut portion slides off the ends of the conductors. This can, in practice, be difficult. In order to comply with the DC Resistance of Ground Path and Tightness of Armor Test Requirements, the metallic sheath must be applied so that it is tight on the conductors and the bonding/grounding conductor. This tight packing arrangement results in substantial frictional resistance between the metallic sheath and the conductors and bonding/grounding conductor when attempting to slide the sheath off the cable assembly.

Thus, it would be desirable to provide an improved Type MC Metal Clad Cable that meets applicable DC Resistance of Ground Path and Tightness of Armor Test requirements, but that includes one or more features that make it easier to remove the metal sheathing when making electrical connections in the field.

SUMMARY OF THE INVENTION

Exemplary embodiments of the present invention are directed to a Metal-Clad Cable. In an exemplary embodiment, the Metal-Clad Cable includes at least two conductor assemblies, a non-linear bonding/grounding conductor and a metallic sheath. Each conductor assembly includes an electrical conductor and a layer of insulation extending around and along the length of each of the electrical conductors. Additional layers, such as a jacket layer and a polymeric protective layer may be disposed around the insulation layer along the length of each of the electrical conductors. A bonding/grounding conductor may be disposed in a cabled relation with the conductor assemblies. The bonding/grounding conductor can have a non-linear geometry to thereby provide a resilient connection between the conductor assemblies A metal clad cable is disclosed. The metal clad cable may include first and second conductor assemblies, where each of the first and second conductor assemblies includes an electrical conductor, a layer of insulation, a jacket layer, and a polymeric protective layer. The non-linear bonding/grounding conductor may have a length, and may include a plurality of undulations along said length. The metal clad cable may further include a metal sheath disposed over the first and second conductor assemblies and the non-linear bonding/grounding conductor. The non-linear bonding/grounding conductor can be in direct contact with an inner surface of the metal sheath.

A metal clad cable is disclosed. The metal clad cable may include at least one conductor assembly, where the conductor assembly includes an electrical conductor and a layer of insulation extending around and along the length of the electrical conductor. The metal clad cable may further include a non-linear bonding/grounding conductor, and a metal sheath disposed over the at least one conductor assembly and the non-linear bonding/grounding conductor. The non-linear bonding/grounding conductor may be in direct contact with an inner surface of the metal sheath and may provide a resilient coupling between the metal sheath and the at least one conductor assembly.

A method of making a metal clad cable is disclosed, comprising: providing a plurality of electrical conductor assemblies, each of the electrical conductor assemblies having a conductor with an insulating layer; providing a non-linear bonding/grounding conductor, the non-linear bonding/grounding conductor having a plurality of undulations along a length thereof; associating the bonding/grounding conductor with the plurality of electrical conductor assemblies; and surrounding the plurality of electrical conductor assemblies and the non-linear bonding/grounding conductor with a metal sheath such that an inner surface of the metal sheath is in direct contact with the bonding/grounding conductor.

BRIEF DESCRIPTION OF THE DRAWINGS

The accompanying drawings illustrate preferred embodiments of the disclosed device so far devised for the practical application of the principles thereof, and in which:

FIG. 4 is a side view of an embodiment of an exemplary non-linear bonding/grounding conductor;

FIG. 5 is a side view of additional embodiments of an exemplary non-linear bonding/grounding conductor;

FIGS. 10A and 10B illustrate an alternative embodiment of a helical non-linear bonding/grounding conductor, in which FIG. 10B is a cross section of the conductor of FIG. 10A taken along line 10B-10B;

DESCRIPTION OF EMBODIMENTS

Figure 1:
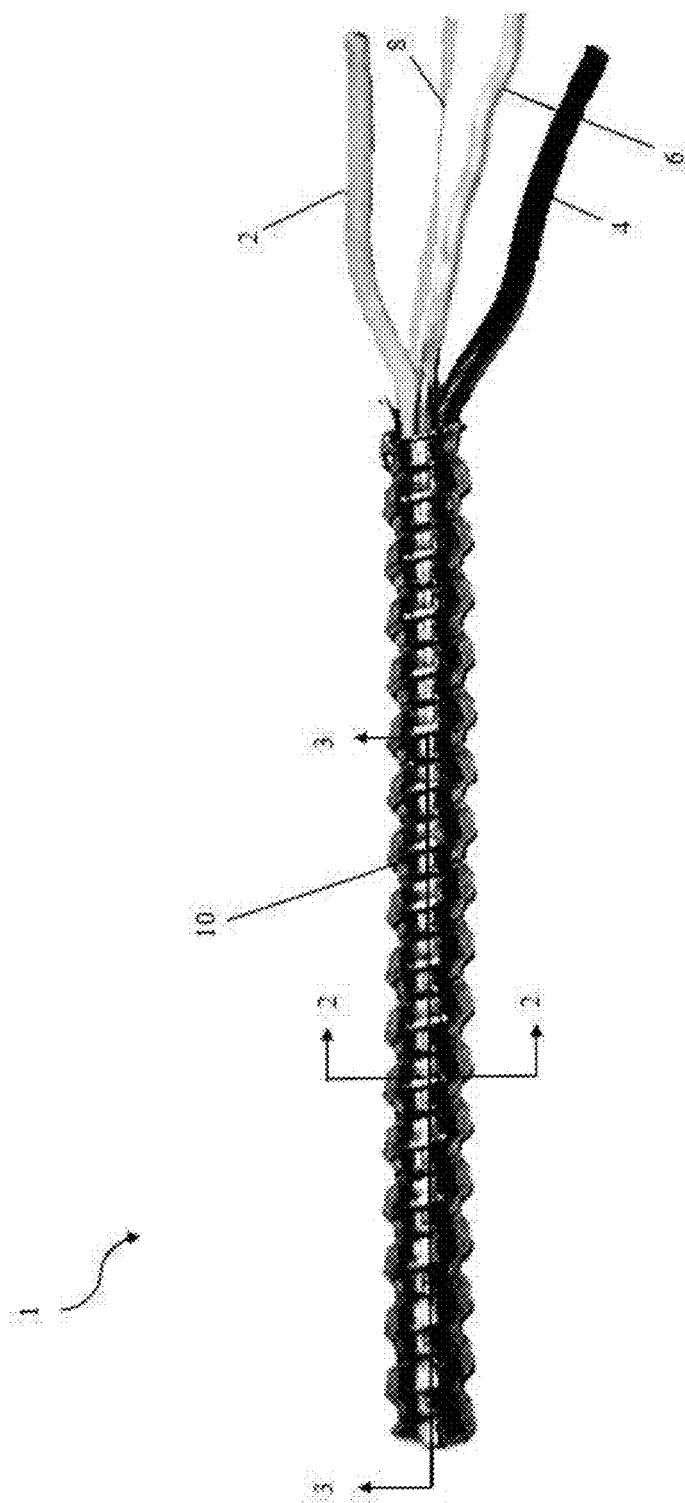
FIG. 1 is a side view of an exemplary embodiment of the disclosed MC cable assembly.

The present invention will now be described more fully hereinafter with reference to the accompanying drawings, in which preferred embodiments of the invention are shown. It will be appreciated, however, that the invention may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIG. 1 shows an exemplary MC cable assembly 1 including a pair of conductor assemblies 2, 4, a bonding/grounding conductor 6, and a marker tape 8. The conductor assemblies 2, 4 and bonding/grounding conductor 6 may be cabled together in a right or left hand lay, while the marker tape 8 may be laid lengthwise along the cabled conductor assemblies and bonding/grounding conductor. The assembly may be enclosed by a metal sheath 10.

Figure 2:
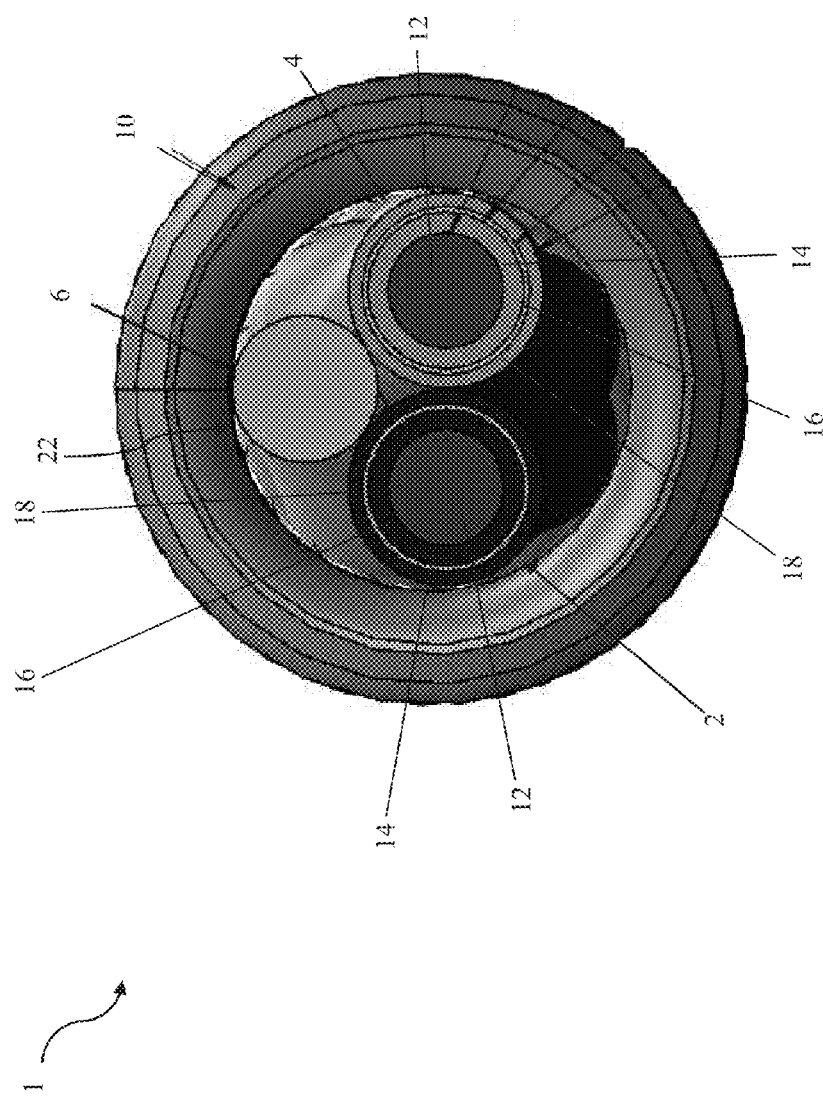
FIG. 2 is a cross sectional view of the MC cable assembly of FIG. 1, taken alone line 2-2 of FIG. 1.

FIG. 2 is a cross sectional view of the MC cable assembly 1 of FIG. 1. Each conductor assembly 2, 4 can include a stranded or solid electrical conductor 12 having a concentric insulation layer(s) 14, a jacket layer 16 disposed on the insulation layer 14, and a polymeric protective layer 18 disposed on the jacket layer 16. The electrical conductor 12, insulation layer 14 and jacket layer 16 may define an NEC® Type THHN, THWN, or THWN-2 insulated conductor. In one exemplary embodiment, the insulation layer 14 is polyvinylchloride (PVC), the jacket layer 16 is nylon, and the polymeric protective layer 18 is polypropylene.

The polymeric protective layer 18 may be disposed on the jacket layer 16 and more particularly, may be extruded over the jacket layer. Although the polymeric protective layer 18 has been disclosed as being polypropylene, in some embodiments it can be made from other materials such as, but not limited to, polyethylene, polyester, etc. The polymeric protective layer 18 can provide mechanical strength to resist buckling, crushing and scuffing of the associated conductor assembly 2, 4.

The polymeric protective layer 18 may be a foamed polymeric material that includes air pockets filled with gasses, some or all of which may be inert. The polymeric protective layer 18 may provide proper positioning and tensioning of the bonding/grounding conductor. It may also be pliable to provide a conforming surface to that of the inside of the metal sheath or the adjacently positioned conductor assemblies.

The metal sheath 10 has a generally circular cross section with a thickness of about 0.005 to about 0.060 inches. This sheath 10 may be formed as a seamless or welded continuous sheath. Alternatively, the sheath may be formed from flat or shaped metal strip, the edges of which are helically wrapped and interlock to form a series of "S" shaped convolutions along the length of the cable 1. In this manner, the metal sheath 10 allows the resulting MC cable 1 to have a desired bend radius sufficient for installation within a building or structure. The sheath 10 may also be formed into shapes other than generally circular such as, for example, rectangles, polygons, ovals and the like. The sheath 10 provides a protective metal covering around the electrical conductor assemblies 2, 4 and the bonding/grounding conductor 6.

Figure 3:
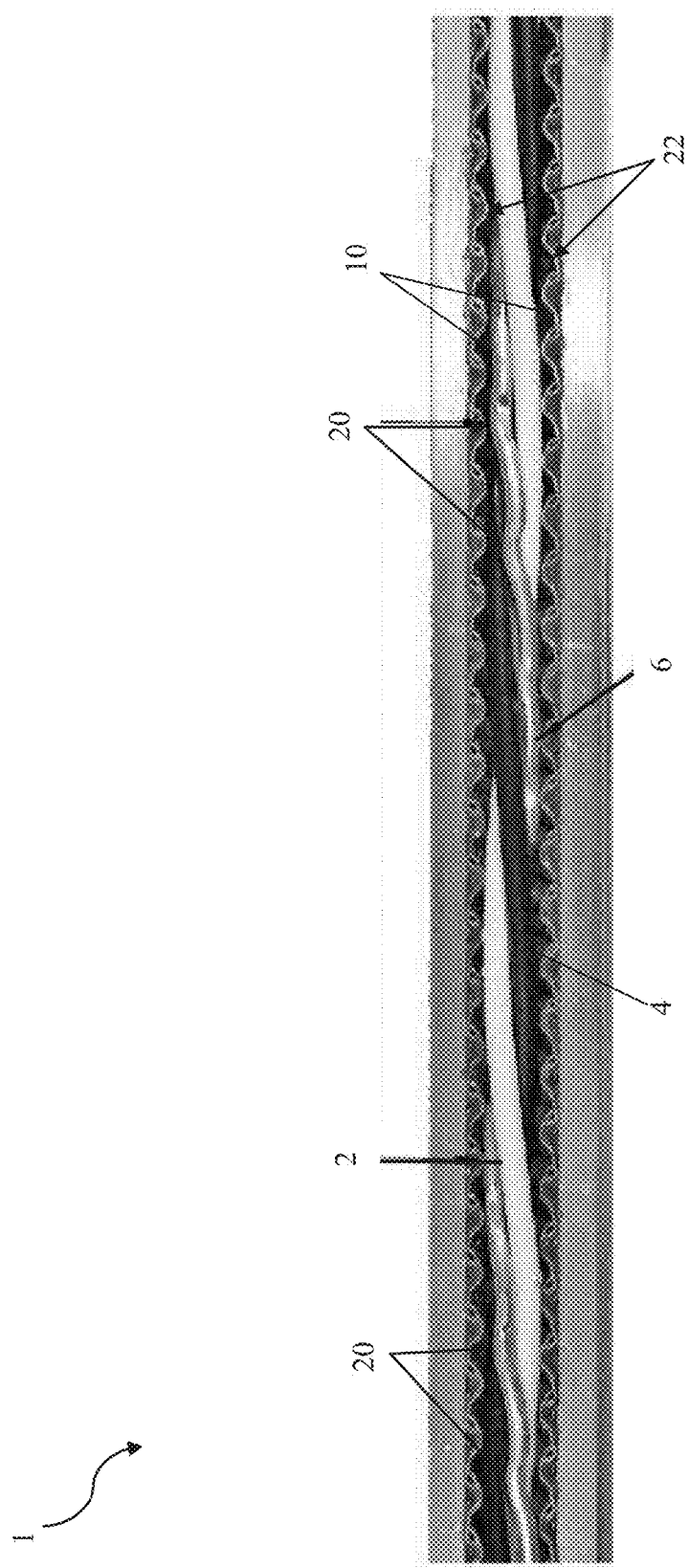
FIG. 3 is another cross-sectional view of the MC cable assembly of FIG. 1, taken along line 3-3 of FIG. 1.

FIG. 3 is a length-wise cross-sectional view of the MC cable assembly 1 of FIG. 1, showing the cabled relationship between the conductor assemblies 2, 4 and the bonding/grounding conductor 6. Also visible in this view is the non-linear nature of the bonding/grounding conductor 6. As can be seen, this non-linearity in the bonding/grounding conductor 6 may manifest in a plurality of undulations 20 disposed along the length of the conductor. As will be described in greater detail later, these undulations 20 serve to provide a robust connection between the bonding/grounding conductor 6 and the metal sheath 10, while also introducing a degree of resiliency or "spring" into the connection. As will be appreciated, this resiliency can make it easier to remove the metal sheath 10 from the conductor assemblies 2, 4 and bonding/grounding conductor 6 when necessary to make terminal connections in the field.

As shown in the embodiment of FIG. 3, bonding/grounding conductor 6 is disposed within the metal sheath 10 and is cabled with the conductor assemblies 2, 4. Alternatively, bonding/grounding conductor 6 may not be cabled with the conductor assemblies, but rather may extend longitudinally along the inside surface of the metal sheath 10 such that a longitudinal axis of the bonding/grounding conductor 6 runs substantially parallel to a longitudinal axis of metal sheath 10.

The bonding/grounding conductor 6 may be in direct contact with an inner surface 22 of the metal sheath 10 and may act in combination with the sheath 10 to define a metal sheath assembly having an ohmic resistance value about equal to or lower than the ohmic resistance requirements necessary to qualify as an equipment grounding conductor. Alternatively, the bonding/grounding conductor 6 may itself have sufficient ohmic resistance to qualify as an equipment grounding conductor.

In the illustrated embodiment, the metal sheath 10 is sized to receive at least two electrical conductor assemblies 2, 4 as well as at least one bonding/grounding conductor 6. The conductor assemblies 2, 4 may each include, for example, 12 AWG solid electrical conductors 12.

FIGS. 4 and 5 illustrate embodiments of the non-linear bonding/grounding conductor 6 for use in the disclosed MC cable assemblies. As can be seen in FIG. 4, one exemplary embodiment of the bonding/grounding conductor 6 has a sinusoidal shape including a plurality of alternating crests 24 and troughs 26 repeat along the longitudinal axis "A-A" of the bonding/grounding conductor. The distance "λ," between adjacent crests 24 and between adjacent troughs 26 can be selected, along with a peak amplitude "A" of the crests 24 and troughs 26, to provide a desired resiliency of the bonding/grounding conductor 6.

In one exemplary embodiment, about nineteen (19) crests and troughs may be provided per linear foot of bonding/grounding conductor 6. This number is, of course, not limiting and is provided merely for purposes of example. In addition, the peak amplitude "A" may be selected so that when the cable is fully assembled, the bonding/grounding conductor 6 has an outer dimension (i.e., two times the peak amplitude "A") that is about equal to or slightly larger (e.g., 0.005 inches) than the outer diameter of the insulated conductors 2, 4. In other embodiments, the peak amplitude "A" may be selected so that when the cable is fully assembled, the bonding/grounding conductor 6 has an outer dimension (i.e., two times the peak amplitude "A") that is slightly smaller than the outer diameter of the insulated conductors 2, 4.

It will be appreciated that the bonding/grounding conductor 6 is subject to tension forces during the cabling process, and thus the number of crests and troughs per foot may decrease as the bonding/grounding conductor stretches under such tension. The bonding/grounding conductor 6 may, therefore, be manufactured so that the peak amplitude "A" of the crests 24 and troughs 26 in the non-tensioned state is slightly greater than the peak amplitude "A" of the crests 24 and troughs 26 in the tensioned state (i.e., the cabled state).

FIG. 5 shows an embodiment of the bonding/grounding conductor 6 in which a "wave" pattern is provided. As can be seen, the bonding/grounding conductor 6 can include asymmetrical crests 28 and troughs 30 such that the crests have a shape that is different from the immediately adjacent troughs. In this embodiment, the crests 28 may have a peak amplitude "B" that is different in magnitude as compared to the peak amplitude "C" of the troughs 30.

It will be appreciated that although sinusoidal and wave geometries have been illustrated, the bonding/grounding conductor 6 can be provided in any of a variety of other geometries to provide the desired undulating arrangement. Examples of such alternative geometries include saw-tooth wave patterns, square wave patterns, spike wave patterns, and the like.

It will be appreciated that the bonding/grounding conductor 6 may have the disclosed undulations (alternating crests and troughs) applied as part of an in-line process of forming an MC cable. Alternatively, the undulations can be imparted to the bonding/grounding conductor 6 in a separate off-line process and then brought "pre-formed" to the cabling/twisting process used to form the MC cable.

The bonding/grounding conductor 6 may be made from any of a variety of materials, including aluminum, copper, copper clad aluminum, tinned copper and the like. In one embodiment, the bonding/grounding conductor 6 is aluminum.

Figure 6:
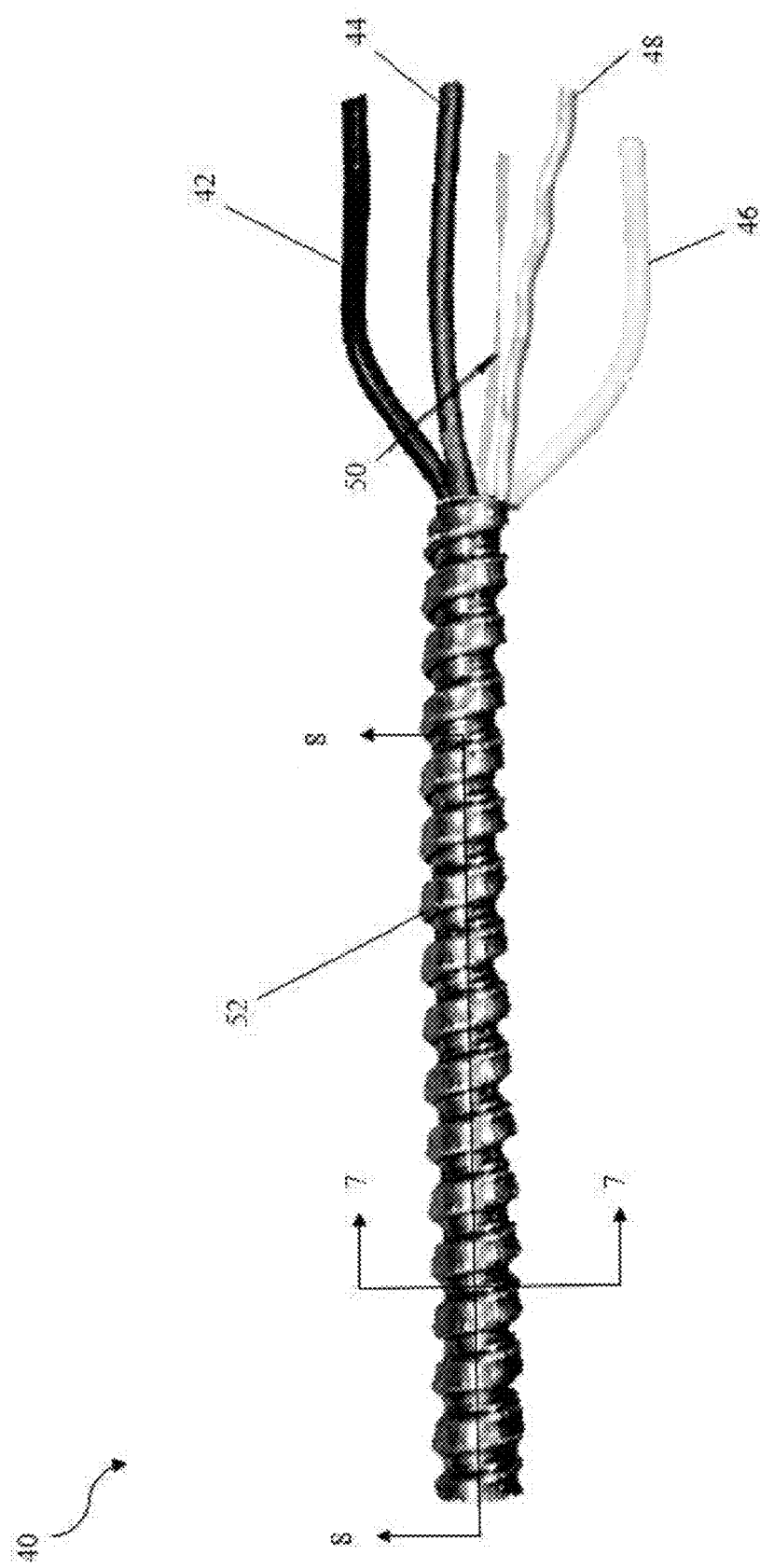
FIG. 6 is a side view of an alternative exemplary embodiment of the disclosed MC cable assembly.
Figure 7:
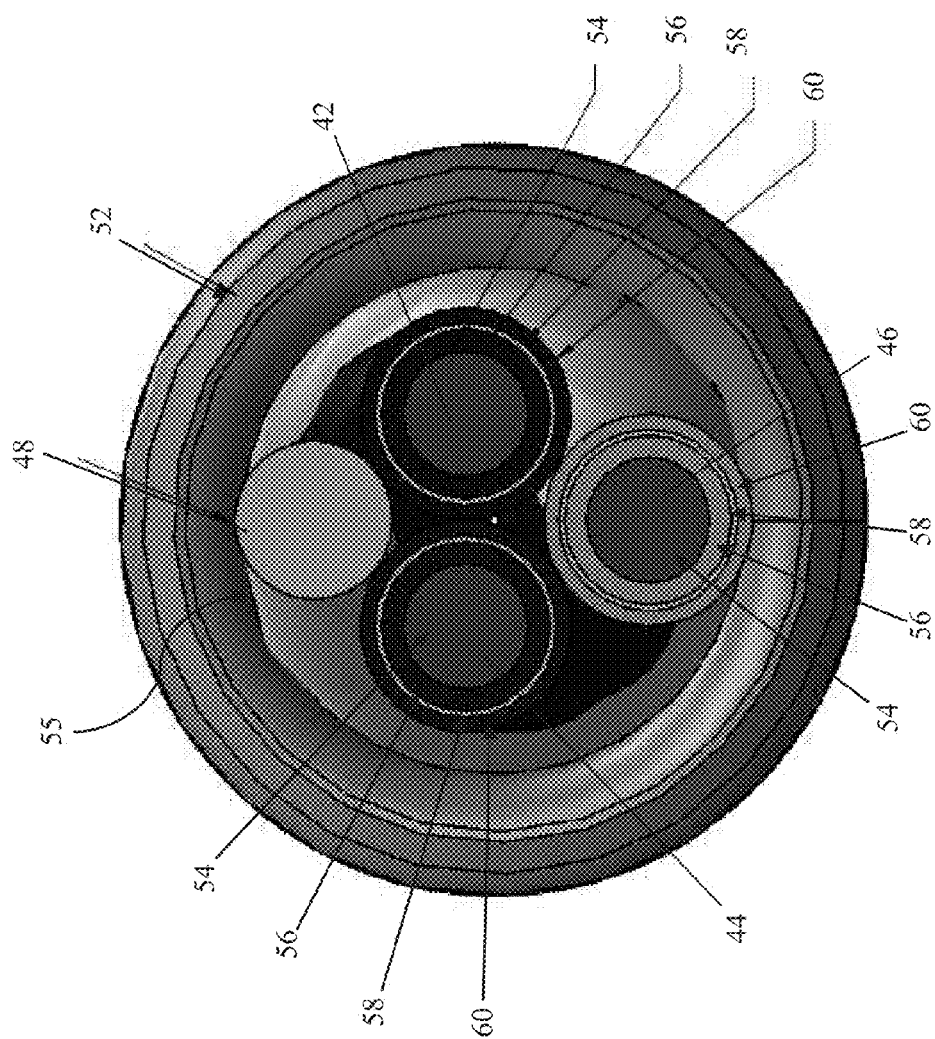
FIG. 7 is a cross sectional view of the MC cable assembly of FIG. 6 taken alone line 7-7 of FIG. 5.
Figure 8:
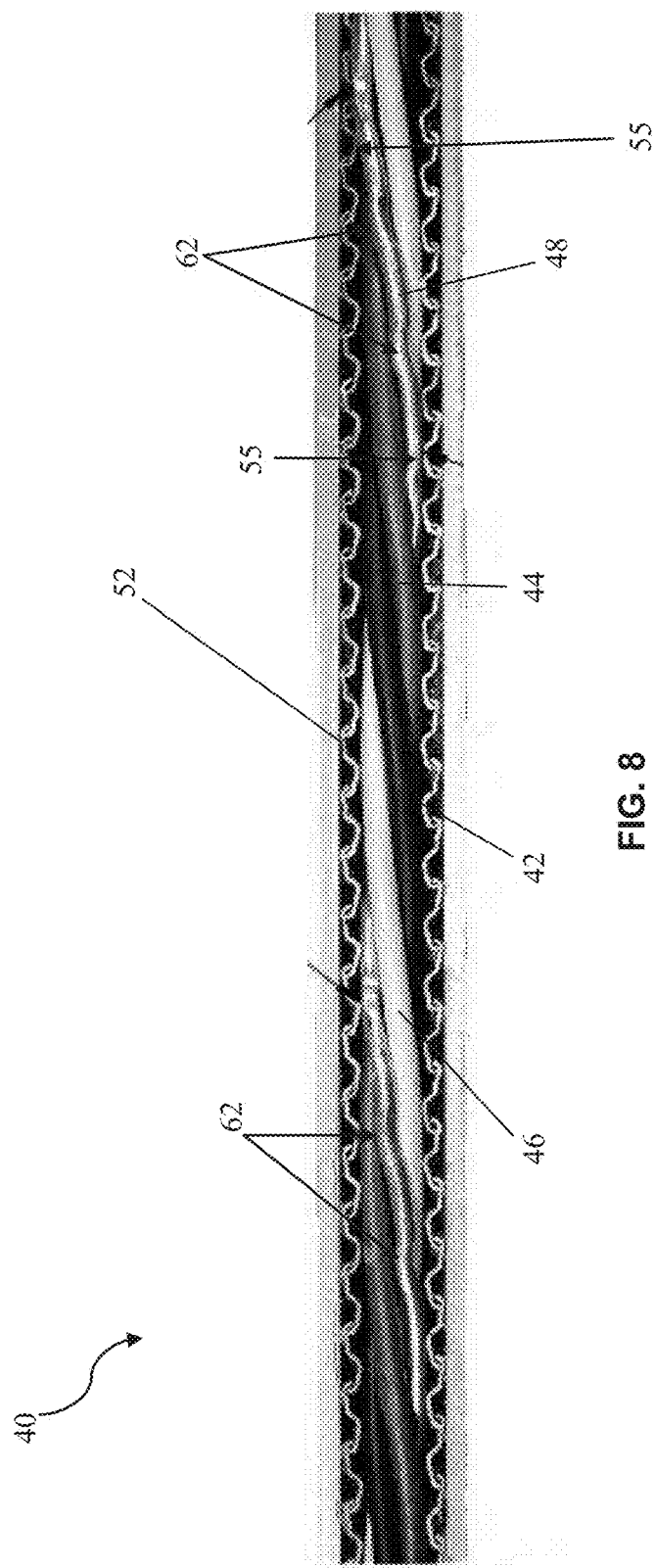
FIG. 8 is another cross-sectional view of the MC cable assembly of FIG. 6, taken along line 8-8 of FIG. 6.

Referring now to FIGS. 6-8, an alternative exemplary MC cable 40 includes a plurality of electrical conductor assemblies 42, 44, 46, a non-linear bonding/grounding conductor 48, and a marker tape 50. A metallic sheath 52 is sized to receive the plurality of electrical conductor assemblies 42, 44, 46 and the bonding/grounding conductor 48. Similar to the conductor assemblies associated with MC cable 1, conductor assemblies 42, 44, 46 include electrical conductors 54 having insulation layers 56, jacket layers 58 and polymeric protective layers 60, respectively. The polymeric protective layer 60 may be a material adapted for extrusion about the insulation and jacket layers 56, 58. Polymeric protective layer 60 may provide mechanical strength to resist buckling, crushing and scuffing to the associated electrical conductor 58.

The electrical conductor 54, insulation layer 56 and jacket layer 58 may define an NEC® Type THHN, THWN or THWN-2 insulated conductor. In one exemplary embodiment, the insulation layer 56 may be polyvinylchloride (PVC), the jacket layer 58 may be nylon, and the polymeric protective layer 60 may be polypropylene (though it may also be made from other materials such as, but not limited to, polyethylene, polyester, etc).

The polymeric protective layer 60 may be disposed on the jacket layer 58 and more particularly, may be extruded over the jacket layer. The polymeric protective layer 60 can provide mechanical strength to resist buckling, crushing and scuffing of the associated conductor assembly 42, 44, 46.

The polymeric protective layer 60 may be a foamed polymeric material that includes air pockets filled with gasses, some or all of which may be inert. The polymeric protective layer may provide proper positioning and tensioning of the bonding/grounding conductor. It may also be pliable to provide a conforming surface to that of the inside of the metal sheath or the adjacently positioned conductor assemblies.

The metal sheath 52 can have a generally circular cross section with a thickness of about 0.005 to about 0.060 inches. This sheath 52 may be formed as a seamless or welded continuous sheath. Alternatively, the sheath may be formed from flat or shaped metal strip, the edges of which are helically wrapped and interlock to form a series of "S" shaped convolutions along the length of the cable. In this manner, the metal sheath allows the resulting MC cable 40 to have a desired bend radius sufficient for installation within a building or structure. The sheath 52 may also be formed into shapes other than generally circular such as, for example, rectangles, polygons, ovals and the like. The sheath 52 provides a protective metallic covering around the electrical conductor assemblies 42, 44, 46 and the non-linear bonding/grounding conductor 48.

FIG. 8 is a length-wise cross-sectional view of the MC cable assembly 40 of FIG. 6, showing the cabled relationship between the conductor assemblies 42, 44, 46 and the bonding/grounding conductor 48. Also visible in this view is the non-linear nature of the bonding/grounding conductor 48. The non-linear bonding/grounding conductor 48 of this embodiment can have some or all of the same features as described in relation to the bonding/grounding conductor 6 described in relation to FIGS. 4 and 5. For example, the non-linearity in the bonding/grounding conductor 48 may include a plurality of undulations 62 disposed along the length of the conductor. As previously noted, these undulations 62 serve to provide a robust connection between the bonding/grounding conductor 48 and the metal sheath 52, while also introducing a degree of resiliency or "spring" into the connection. This resiliency can facilitate removing the metal sheath 52 from the conductor assemblies 42, 44, 46 and bonding/grounding conductor 48 when necessary to make terminal connections in the field.

As shown in the embodiment of FIGS. 6-8, bonding/grounding conductor 48 is disposed within the metal sheath 52 and is cabled with the conductor assemblies 42, 44, 46. Alternatively, the bonding/grounding conductor 48 may not be cabled with the conductor assemblies, but rather may extend longitudinally along the inside surface of the metal sheath 52 such that a longitudinal axis of the bonding/grounding conductor 48 runs substantially parallel to a longitudinal axis of metal sheath 52.

The bonding/grounding conductor 48 may be in direct contact with an inner surface 55 of the metal sheath 52 and may act in combination with the sheath to define a metal sheath assembly having an ohmic resistance value about equal to or lower than the ohmic resistance requirements necessary to qualify as an equipment grounding conductor. Alternatively, the bonding/grounding conductor 48 may itself have sufficient ohmic resistance to qualify as an equipment grounding conductor.

In the illustrated embodiment, the metal sheath 52 is sized to receive at least three electrical conductor assemblies 42, 44, 46 as well as at least one bonding/grounding conductor 48. The conductor assemblies 42, 44, 46 may each include, for example, 12 AWG solid electrical conductors 54.

It will be appreciated that although MC cable assemblies 1, 40 have been disclosed as include two and three electrical conductor assemblies, this is not limiting. Rather, MC cable assemblies according to embodiments of the disclosure can contain greater numbers of electrical conductor assemblies than three. For example, MC cable assemblies can be configured to have 7, 12, 19, 37 or more insulated conductors.

As will be appreciated, the use of a non-linear bonding/grounding conductor within a cable assembly can facilitate removing the metal sheath when making terminal connections. This owes, at least in part, to the resilience provided by the non-linear bonding/grounding conductor. The disclosed arrangement also ensures that a desired intimate connection is maintained between the metal sheath and the bonding/grounding conductor.

Figure 9:
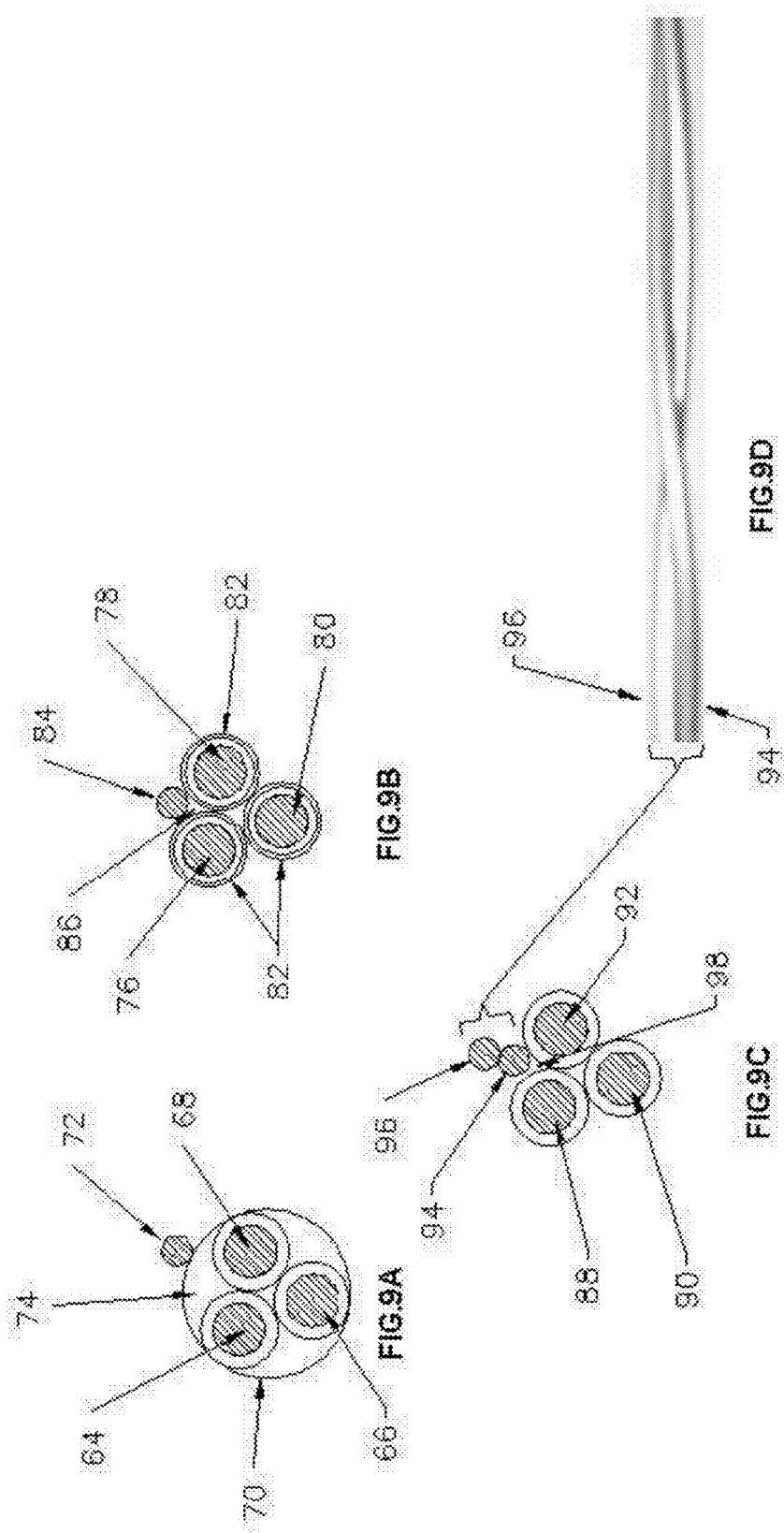
FIGS. 9A-9D illustrate alternative embodiments of MC cables employing the disclosed non-linear bonding/grounding conductor.

FIGS. 9A-9D illustrate a plurality of alternative arrangements of an MC cable assembly according to the disclosure. FIG. 9A shows a plurality of insulated conductors 64, 66, 68 cabled together in a longitudinally twisted bundle and encased in an overall cover 70. The overall cover 70 can be any of a variety of fibrous and/or polymer materials. A bare bonding/grounding conductor 72 may be positioned externally against the overall cover 70 and within an interstice 74 created by at least two of the conductors. The bare bonding/grounding conductor 84 may be non-linear and may have some or all of the characteristics of the non-linear bonding/grounding conductors described in relation to the previous embodiments. The bare bonding/grounding conductor may be cabled with the insulated conductors 64, 66, 68, with the same lay and in concert with the cabling of the conductors. Alternatively, the bare bonding/grounding conductor may be laid parallel to the insulated conductors 64, 66, 68. Though not shown, a metal sheath may be applied over the plurality of insulated conductors 64, 66, 68 and the bare bonding/grounding conductor 72 so that the bare bonding/grounding conductor directly contacts the internal surface of the metal sheath.

FIG. 9B shows a plurality of insulated conductors 76, 78, 80, each of which is encased by a fibrous and/or polymer covering 82. The covered conductors 76, 78, 80 are then cabled together in a longitudinally twisted bundle. A bare bonding/grounding conductor 84 may be positioned within an interstice 86 created by at least two of the conductors so that the bonding/grounding conductor presses against the coverings 82 of the insulated conductors. The bare bonding/grounding conductor 84 may be non-linear and may have some or all of the characteristics of the non-linear bonding/grounding conductors described in relation to the previous embodiments. The bare bonding/grounding conductor 84 may be cabled with the insulated conductors 76, 78, 80, with the same lay and in concert with the cabling of the conductors. Alternatively, the bare bonding/grounding conductor 84 may be laid parallel to the insulated conductors 76, 78, 80. Though not shown, a metal sheath may be applied over the plurality of insulated conductors 76, 78, 80 and the bare bonding/grounding conductor 84 so that the bare bonding/grounding conductor directly contacts the internal surface of the metal sheath.

FIG. 9C shows a plurality of insulated conductors 88, 90, 92 and a pair of bare bonding/grounding conductors 94, 96. In one embodiment, the pair of bare bonding/grounding conductors 94, 96 are cabled together in the manner shown in FIG. 9D. The insulated conductors 88, 90, 92 may be cabled together in a longitudinally twisted bundle, and the twisted pair of bare bonding/grounding conductors 94, 96 may be positioned within an interstice 98 created by at least two of the conductors. The pair of bare bonding/grounding conductors 94, 96 may be cabled with the insulated conductors 88, 90, 92, with the same lay and in concert with the cabling of the conductors. Alternatively, the pair of bare bonding/grounding conductors 94, 96 may be laid parallel to the insulated conductors 88, 90, 92. The twisted pair of bare bonding/grounding conductors 94, 96 may, in their combined form, provide a desired overall non-linear external shape that may provide some or all of the benefits of the previously-described non-linear bonding/grounding conductors. Though not shown, a metal sheath may be applied over the plurality of insulated conductors 88, 90, 92 and the pair of bare bonding/grounding conductors 94, 96 so that the bare bonding/grounding conductors directly contact the internal surface of the metal sheath.

It will be appreciated that although the embodiments described in relation to FIGS. 9A-9D show three insulated conductors, that greater or fewer insulated conductors could also be used. In addition, the insulated conductors may include additional layers, including a jacket layer overlying the insulation layer, and/or a protective layer overlying the jacket layer.

Figure 10:
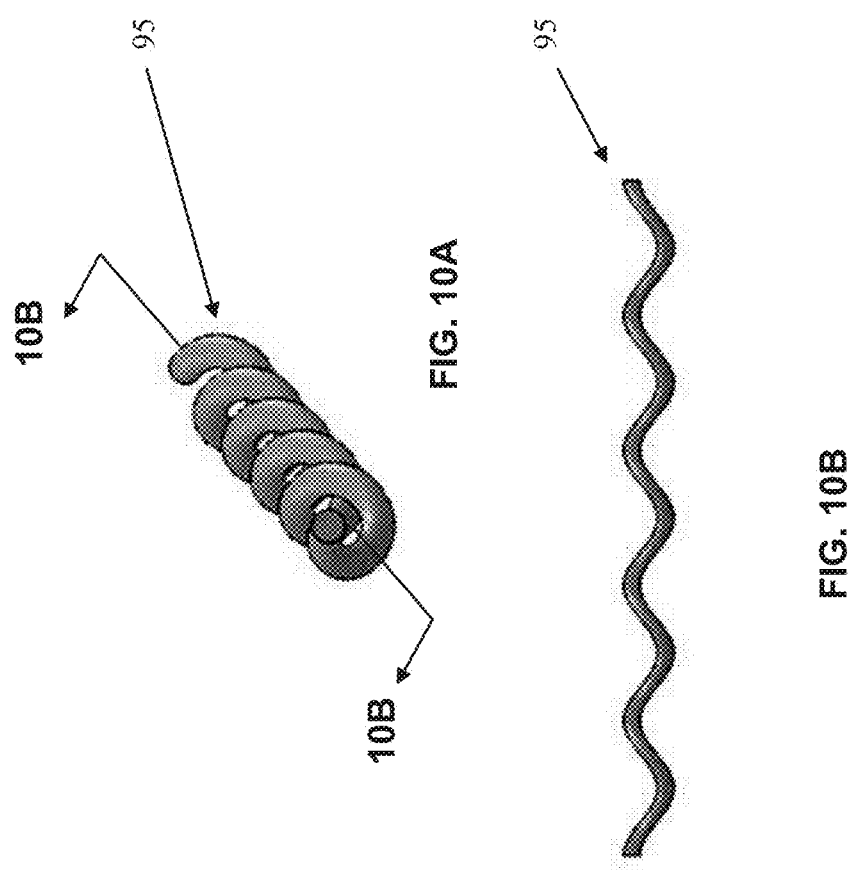

FIGS. 10A and 10B show an alternative embodiment of a non-linear bonding/grounding conductor 95 in which the non-linearity is displayed in three-dimensions, resulting in a helical (spring) arrangement. The non-linear bonding/grounding conductor 95 of this embodiment can, like the prior embodiments, provide a desired degree of resiliency into the connection between the bonding/grounding conductor 95 and the metal sheath (not shown). As with the previously described embodiments, the helical non-linear bonding/grounding conductor 95 may be cabled with one or more insulated conductors with the same lay and in concert with the cabling of the conductors. Alternatively, the helical non-linear bonding/grounding conductor may be laid parallel to the one or more insulated conductors. As will be appreciated, where the helical non-linear bonding/grounding conductor is cabled together with one or more insulated conductors, the helical bonding/ground conductor will assume a doubly-helical shape. This is because the helical (spring-shaped) bonding/grounding conductor is then wrapped/cabled in a helical fashion with the one or more insulated conductors). Though not shown, a metal sheath will be applied over the insulated conductor(s) and the helical non-linear bonding/grounding conductor 95 so that the bonding/grounding conductor directly contacts an internal surface of the metal sheath.

Figure 11:
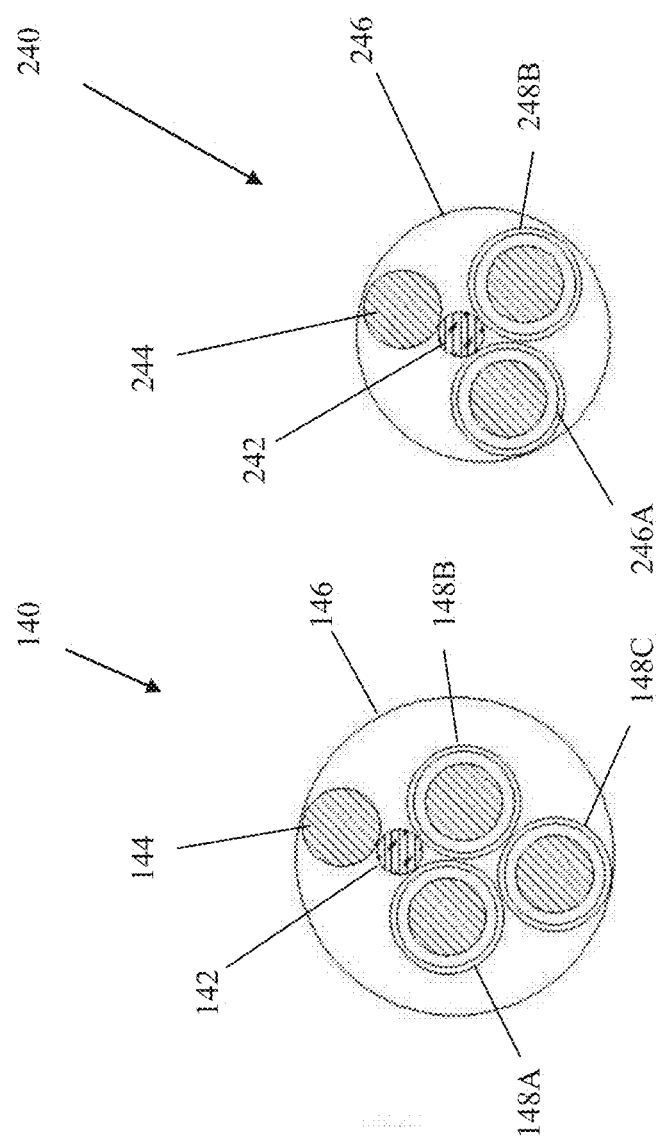
FIGS. 11A and 11B illustrate alternative embodiments of MC cables employing a non-linear bonding/grounding conductor and a filler.

FIGS. 11A and 11B illustrate further embodiments of MC cable assemblies 140, 240 which include a longitudinally oriented filler member 142, 242 disposed beneath the non-linear bonding/grounding conductor 144, 244 to press the non-linear bonding/grounding conductor radially outward into contact with the inside surface of the metal sheath 146, 246. The filler member 142, 242 can be made from any of a variety of fiber or polymer materials. In some embodiments the filler member 142, 242 may enable the use of a non-linear bonding/grounding conductor having a reduced peak amplitude "A" as compared to previous embodiments. As illustrated, this filler member 142, 242 can be used with MC Cable assemblies having any number of insulated conductor assemblies. Thus, FIG. 11A shows an MC Cable assembly 140 having three insulated conductors 148A-C while FIG. 11B shows an MC Cable assembly 240 having two insulated conductors, 248A-B. Other arrangements including fewer or greater numbers of insulated conductors are also contemplated.

Figure 12:
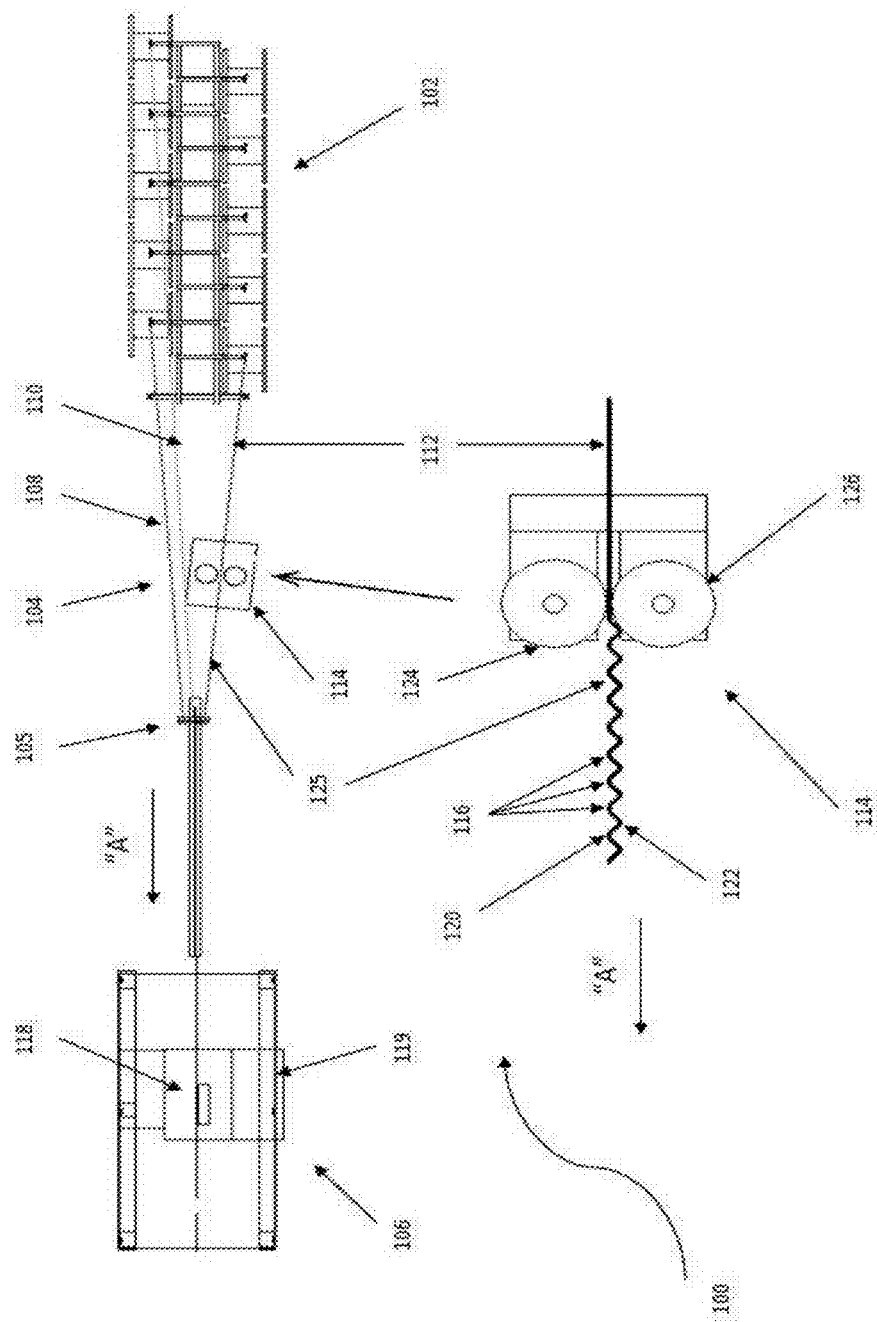
FIG. 12 is a schematic of an exemplary arrangement for making an embodiment of the disclosed MC cable assembly.

FIG. 12 shows an exemplary system 100 for manufacturing the disclosed MC cable. The system 100 may include a payoff portion 102, a bonding/grounding conductor crimping portion 104, a lay plate/closing die portion 105 and a cable twister portion 106. The payoff portion 102 may comprise a plurality of reels that include wound lengths of insulated conductors 108, 110 and bare bonding/grounding conductor 112. The bonding/grounding conductor crimping portion 104 may include a crimping station 114 for imparting the previously described undulations 116 in the bonding/grounding conductor (shown as item 125 once it exits the crimping portion 104). The lay plate/closing die portion 105 takes the insulated conductors 108, 110 and the non-linear bonding/grounding conductor 125 and cables them together in a desired lay. The cable twister portion 106 may comprise a rotating arm 118 and a take-up reel 119. The rotating arm 118 may be configured to apply a desired twisting force to the insulated conductors 108, 110 and the non-linear bonding/grounding conductor 125 and may also serve to wind the assembled conductors onto the take-up reel 119. The cable twister portion 106 may also load the cabled conductors onto a reel for transport to an armoring station, where a metal sheath may be applied over the assembly. In one embodiment, the cable twister portion 106 provides the unreeling force that pulls the insulated conductors and the bare bonding/grounding conductor 112 off their respective reels at the payoff portion 102 and moves the conductors in the direction of arrow "A." The cable twister portion 106 also provides the tension force that stretches the non-linear bonding/ground conductor and flattens the undulations, as previously described. Thus, the number of undulations 116 per foot may decrease as the bonding/grounding conductor stretches under such tension. The bonding/grounding conductor 125 may, therefore, be manufactured so that the peak amplitude "A" of the crests 120 and troughs 122 at the outlet of the crimping station 114 is slightly greater than the peak amplitude "A" of the crests 120 and troughs 122 in the tensioned state (i.e., the cabled state, in the cable twister portion 106).

Any of a variety of mechanisms can be used to impart the undulations 116 to the bonding/grounding conductor 112. In the illustrated embodiment, the crimping station 114 includes a pair of intermeshing gears 124, 126, between which the bonding/grounding conductor 112 is fed. As the bonding/grounding conductor 112 is pulled by the cable twister portion 106 in the direction of arrow "A," the intermeshing gears 124, 126 rotate. The bonding/grounding conductor is thus shaped or formed between the intermeshing gear teeth. In the illustrated embodiment, the gear teeth are rounded to impart a substantially sinusoidal geometry to the resulting bonding/grounding conductor 125. It will be appreciated that other teeth geometries can be used to provide a bonding/grounding conductor 112 with a desired set of undulations. In addition, the rotational axes of the intermeshing gears 124, 126 may be offset from each other so as to provide a desired gap between the intermeshing teeth. This offset may be adjusted to render the bonding/grounding conductor with crests and troughs 120, 122 having a desired peak amplitude "A" (see FIG. 4).

Figure 13:
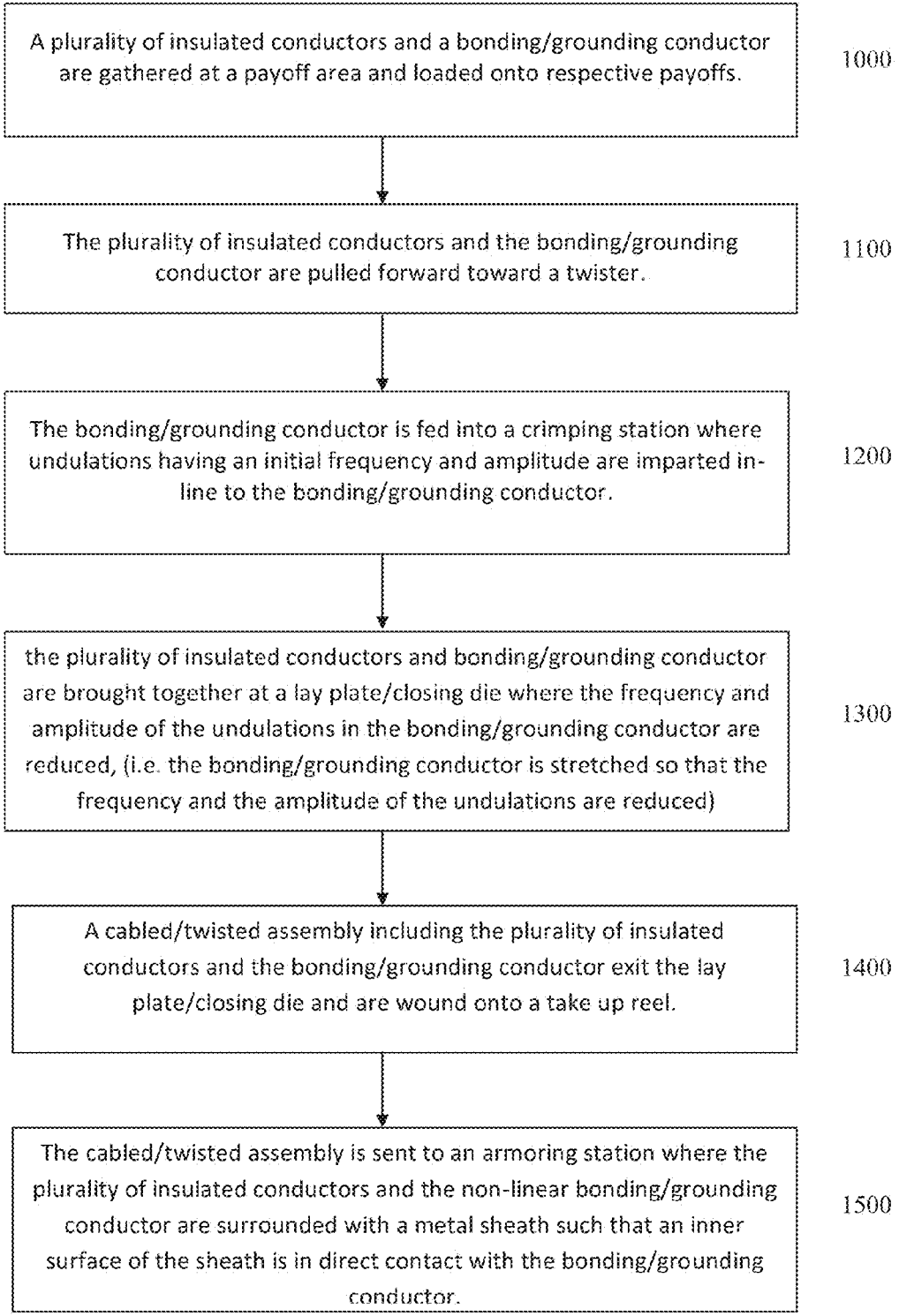
FIG. 13 is a flow chart illustrating an exemplary method of making an embodiment of the disclosed MC cable assembly.

Referring now to FIG. 13, a method of making an MC cable assembly will be described in greater detail. At step 1000, a plurality of insulated conductors and a bonding/grounding conductor are gathered at a twister/cabler payoff area and loaded onto respective payoffs. At step 1100, the plurality of insulated conductors and the bonding/grounding conductor 6 are pulled forward toward a twister. At step 1200, the bonding/grounding conductor is fed into a crimping station where undulations having an initial frequency and amplitude are imparted in-line to the bonding/grounding conductor. At step 1300, the plurality of insulated conductors and bonding/grounding conductor are brought together at a closing die where the frequency and amplitude of the undulations in the bonding/grounding conductor are reduced, (i.e. the bonding/grounding conductor is stretched so that the frequency and the amplitude of the undulations are reduced). At step 1400, a cabled/twisted assembly including the plurality of insulated conductors and the bonding/grounding conductor exit the closing die and are wound onto a take up reel. In one embodiment, this step further stretches the bonding/grounding conductor so that the frequency and the amplitude of the undulations are further reduced to a desired frequency and amplitude. In one embodiment, the desired amplitude is such that twice the peak amplitude of the undulations is about the same or slightly greater than an outside diameter of each of the insulated conductors. At step 1500, the cabled/twisted assembly is sent to an armoring station where the plurality of insulated conductors and the non-linear bonding/grounding conductor are surrounded with a metal sheath such that an inner surface of the sheath is in direct contact with the bonding/grounding conductor.

The described embodiment of the method notes that undulations are imparted to the bonding/grounding conductor in-line as part of the cable assembly process. This is not critical, and it will be appreciated that the undulations may imparted to the bare aluminum bonding/grounding conductor in a separate off-line process and then brought into the cabling/twisting process in a pre-formed condition.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof. While the invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed is:

1. A metal clad cable, comprising:
   first and second conductor assemblies, each of said first and second conductor assemblies including an electrical conductor, a layer of insulation, a jacket layer, and a polymeric protective layer;
   a non-linear bonding/grounding conductor having a length, the non-linear bonding/grounding conductor having a shape including a plurality of undulations along said length, the undulations along said length including a plurality of alternating crests and troughs that repeat along a longitudinal axis of the bonding/grounding conductor; and
   a metal sheath disposed over the first and second conductor assemblies and the non-linear bonding/grounding conductor;
   wherein the non-linear bonding/grounding conductor is in contact with an inner surface of the metal sheath;
   wherein the non-linear bonding/grounding conductor is cabled with the first and second conductor assemblies; and
   wherein the non-linear bonding/grounding conductor has a helical shape including a plurality of circumferential revolutions and a plurality of undulations along each of the plurality of circumferential revolutions.

2. The metal clad cable of claim 1, wherein the plurality of undulations comprise a plurality of alternating crests and troughs.

3. The metal clad cable of claim 2, wherein the plurality of alternating crests and troughs are symmetrical along the length of the non-linear bonding/grounding conductor.

4. The metal clad cable of claim 2, wherein each of said crests has a shape that is different from a shape of a directly adjacent trough.

5. The metal clad cable of claim 2, wherein the plurality of undulations comprise a plurality of alternating asymmetrical crests and troughs.

6. The metal clad cable of claim 1, wherein the layer of insulation is polyvinyl chloride, the jacket layer is nylon, and the polymeric protective layer is a material that is different from the insulating layer and the jacket layer.

7. The metal clad cable of claim 1, further comprising a third conductor assembly including an electrical conductor, a layer of insulation, a jacket layer, and a polymeric protective layer, wherein the non-linear bonding/grounding conductor is cabled with the first, second and third conductor assemblies, and the metal sheath is disposed over the first, second and third conductor assemblies and the non-linear bonding/grounding conductor.

8. The metal clad cable of claim 1, comprising "n" conductor assemblies, each conductor assembly of said "n" conductor assemblies including an electrical conductor, a layer of insulation, a jacket layer, and a polymeric protective layer, wherein the non-linear bonding/grounding conductor is cabled with the "n" conductor assemblies, and the metal sheath is disposed over the "n" conductor assemblies and the non-linear bonding/grounding conductor, and wherein "n" is an integer greater than 2.

9. The metal clad cable of claim 1, wherein the non-linear bonding/grounding conductor comprises a helical shape.

10. The metal clad cable of claim 1, further comprising a filler member in contact with the non-linear bonding/grounding conductor and configured to press the non-linear bonding/grounding conductor into contact with the inner surface of the metal sheath.

11. A metal clad cable, comprising:
    a plurality of conductor assemblies, each of the conductor assemblies having an electrical conductor and a layer of insulation extending around and along a length of said electrical conductor;
    a non-linear bonding/grounding conductor, the non-linear bonding/grounding conductor including a plurality of undulations along a length thereof, the plurality of undulations along the length of the non-linear bonding/grounding conductor including a plurality of alternating crests and troughs that repeat along a longitudinal axis of the electrical conductor; and
    a metal sheath disposed over the at least one conductor assembly and the non-linear bonding/grounding conductor;
    wherein the non-linear bonding/grounding conductor is in contact with an inner surface of the metal sheath and provides a resilient coupling between the metal sheath and at least one of the conductor assemblies; and
    wherein the non-linear bonding/grounding conductor has a helical shape including a plurality of circumferential revolutions, each of the plurality of circumferential revolutions including multiple undulations from the plurality of undulations that extend along the length of non-linear bonding/grounding conductor.

12. The metal clad cable of claim 11, wherein the at least one conductor assembly further comprises a polymeric protective layer disposed around said insulation layer along a length of said insulation layer.

13. The metal clad cable of claim 11, wherein the non-linear bonding/grounding conductor is in cabled relation with the at least one conductor assembly.

14. The metal clad cable of claim 11, wherein the plurality of undulations comprise a plurality of alternating asymmetrical crests and troughs.

15. The metal clad cable of claim 11, wherein the alternating crests and troughs are symmetrical along the length of the bonding/grounding conductor.

16. The metal clad cable of claim 11, wherein each of the crests has a shape that is different from a shape of a directly adjacent trough.

17. The metal clad cable of claim 11, further comprising a jacket layer between the insulating layer and the polymeric protective layer.

18. The metal clad cable of claim 11, wherein the at least one conductor assembly comprises "n" conductor assemblies, each conductor assembly of said "n" conductor assemblies including an electrical conductor and a layer of insulation, wherein the non-linear bonding/grounding conductor is cabled with the "n" conductor assemblies, and the metal sheath is disposed over the "n" conductor assemblies and the non-linear bonding/grounding conductor, and wherein "n" is an integer greater than 2.

19. The metal clad cable of claim 11, wherein said at least one conductor assembly is encased in a fibrous or polymer covering layer, the fibrous or polymer covering layer extending around and along the length of the at least one conductor assembly, the non-linear bonding/grounding conductor contacting an outside surface of the fibrous or polymer covering layer.

20. The metal clad cable of claim 11, wherein said at least one conductor assembly comprises a plurality of conductor assemblies, the metal clad cable further comprising a fiber or polymer cover encasing the conductor assemblies, the fiber or polymer cover layer extending around and along the length of the conductor assemblies, the non-linear bonding/ grounding conductor contacting an outside surface of the fibrous or polymer cover layer.

21. The metal clad cable of claim 11, wherein the non-linear bonding/grounding conductor comprises a helical shape.

22. The metal clad cable of claim 11, further comprising a filler member in contact with the non-linear bonding/grounding conductor and configured to press the non-linear bonding/grounding conductor into contact with the inner surface of the metal sheath.

* * * * *